United States Patent
LaBella et al.

(10) Patent No.: US 9,654,003 B1
(45) Date of Patent: May 16, 2017

(54) METHODS AND APPARATUS FOR RESONANT ENERGY MINIMIZATION IN ZERO VOLTAGE TRANSITION POWER CONVERTERS

(71) Applicant: Texas Instruments Incorporated, Dallas, TX (US)

(72) Inventors: Thomas Matthew LaBella, Dallas, TX (US); Michael G. Amaro, Naperville, IL (US); Jeffrey Anthony Morroni, Parker, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/982,750

(22) Filed: Dec. 29, 2015

(51) Int. Cl.
  *H02M 3/158* (2006.01)
  *H02M 7/537* (2006.01)
  *H02M 1/00* (2006.01)

(52) U.S. Cl.
  CPC ........... *H02M 3/158* (2013.01); *H02M 7/537* (2013.01); *H02M 2001/0058* (2013.01)

(58) Field of Classification Search
  CPC ......... H02M 1/083; H02M 2001/0058; H02M 3/156; H02M 3/158; H02M 3/155; H02M 3/33507; H02M 2007/4815; H02M 2007/4818
  USPC ........... 363/21.02, 21.03; 323/235, 282, 284, 323/319, 351
  See application file for complete search history.

(56) References Cited

U.S. PATENT DOCUMENTS

| | | | | |
|---|---|---|---|---|
| 5,594,635 A | * | 1/1997 | Gegner | H02M 3/158 363/124 |
| 5,684,688 A | * | 11/1997 | Rouaud | H02M 1/34 363/132 |
| 9,172,299 B2 | * | 10/2015 | Hamza | H02M 1/44 |

(Continued)

FOREIGN PATENT DOCUMENTS

WO  WO 2015105795 A1 * 7/2015 .......... H02M 3/1588

OTHER PUBLICATIONS

Hua, Guichao, C. Leu, Y. Jiang and F. C. Y. Lee. "Novel Zero-Voltage-Transition PWM Converters." vol. 9, No. 2, Mar. 1994, IEEE Transactions on Power Electronics, pp. 213-219.

(Continued)

*Primary Examiner* — Adolf Berhane
(74) *Attorney, Agent, or Firm* — John R. Pessetto; Charles A. Brill; Frank D. Cimino

(57) ABSTRACT

In a method arrangement, providing a zero voltage transition circuit including an input node, an output node, a switch node, an output inductor coupling the switch node and output node, an output capacitor coupling the output node and ground, a first switch coupling the input node and switch node, a second switch coupling switch node and ground, a first auxiliary switch coupling the input node to an auxiliary node, a second auxiliary switch coupling the auxiliary node to ground, and an auxiliary inductor coupling the auxiliary node to the switch node; closing the first auxiliary switch to couple the input to the auxiliary node; subsequently, when a current is below a cutoff threshold, opening the second switch; after a first delay period, opening the first auxiliary switch and closing the second auxiliary switch; and after a second delay period, closing the first switch. Apparatus and additional method arrangements are disclosed.

20 Claims, 7 Drawing Sheets

(56) References Cited

U.S. PATENT DOCUMENTS

| | | | | |
|---|---|---|---|---|
| 2009/0237042 A1* | 9/2009 | Glovinski | ............... | H02M 1/34 |
| | | | | 323/235 |
| 2012/0218785 A1* | 8/2012 | Li | ........................... | H02M 1/34 |
| | | | | 363/21.12 |
| 2013/0235631 A1* | 9/2013 | Pahlevaninezhad | .... | H02M 1/42 |
| | | | | 363/126 |

OTHER PUBLICATIONS

Asad Abidi et al., "Understanding the Regenerative Comparator Circuit" Electrical Engineering Department, University of California, Los Angeles, 2014 IEEE, 8 pgs.
Behzad Razavi, "The StrongARM Latch", A Circuit for All Seasons, IEEE Solid-State Circuits Magazine, Spring 2015, pp. 12-17.
http://escholarship.org/us/item/6st6k2nz, 2.5.4 Comparator Design, pp. 27-28, 2013.
Jing Xue, Ho Lee, "A 2MHz 12-to-100V 90%-Efficiency Self-Balancing ZVS Three-Level DC-DC Regulator with Constant-Frequency AOT V2 Control and 5ns ZVS Turn-On Delay", ISSCC 2016 / Session 12 / Efficient Power Conversion / 12.5, 2016 IEEE International Solid-State Circuits Conference, Digest of Technical Papers, pp. 226-228.

* cited by examiner

METHODS AND APPARATUS FOR RESONANT ENERGY MINIMIZATION IN ZERO VOLTAGE TRANSITION POWER CONVERTERS

TECHNICAL FIELD

The present application relates in general to electronic circuitry, and in particular to methods and circuitry for increased efficiency in switching power converters using zero voltage transition (ZVT) switching at the primary power switch or transistor sourcing power to a load.

BACKGROUND

A category of power supplies known as switching power supplies date back several decades and are currently heavily utilized in the electronics industry. Switching power supplies are commonly found in many types of electronic equipment such as industrial machinery, automotive electronics, computers and servers, mobile consumer electronics (mobile phones, tablets, etc.), battery chargers for mobile electronics, and low cost/light weight items such as wireless headsets and key chain flashlights. Many applications include switching power supplies for portable, battery powered devices where an initial voltage is stepped down to a reduced voltage for part of the device, such as integrated circuits that operate at fairly low DC levels. Switching supplies are popular because these powers supplies can be arranged to be light weight, low cost, and are highly efficient in the conversion of the voltage and current levels of electric power when compared to the prior approaches using non-switching power supplies such as linear power supplies.

High efficiency is achieved in switching power supplies by using high speed low loss switches such as MOSFET transistors to transfer energy from the input power source (a battery, for example) to the electronic equipment being powered (the load) only when needed, so as to maintain the voltage and current levels required by the load.

Switching power supplies that perform conversion from a direct current (DC) input (such as a battery) that supplies electric energy within a specific voltage and current range to a different DC voltage and current range required by the load are known as "DC-DC" converters. Many modern prior known approach DC-DC converters are able to achieve efficiencies near or above 90% by employing zero voltage transition (ZVT) functionality. The ZVT technique was developed by Hua, et. al. and described in a paper published in 1994 ("Novel Zero-Voltage-Transition PWM Converters," G. Hua, C.-S. Leu, Y. Jiang, and F. C. Lee, *IEEE Trans. Power Electron.*, Vol. 9, No. 2, pp. 213-219, Mar. 1994). The use of the ZVT function in prior known approach DC-DC converters reduces energy loss that would otherwise occur due to switching and has the additional benefit of reducing voltage stress on primary power switches of DC-DC converters. Reduction in voltage stress on a switch allows the switch to have a lower voltage tolerance rating and, therefore, potentially the switch can be made smaller and less costly.

The ZVT circuitry employed by prior DC-DC converters introduces additional switches and corresponding additional energy loss and voltage stress on switching elements. However, the impact of energy loss and voltage stress of the ZVT function is much less significant than the overall performance improvements to switching converters that employ ZVT functionality. Further improvements to reduce energy loss and voltage stress of the ZVT function are still needed and these improvements will permit improvement of electronic equipment in multiple ways including increased battery life, lower cost of operation, and improved heat management.

To better illustrate the shortcomings of the prior known ZVT approaches, circuit 10 of FIG. 1 illustrates a typical ZVT DC-DC converter arranged in a circuit topology known as a buck converter. Buck DC-DC converters provide an output voltage at a lower voltage than an input voltage. Other types of DC-DC converters that can benefit from the use of ZVT switching include, but are not limited to, boost converters that increase voltage to the load to a voltage greater than the input voltage, and buck-boost DC-DC converters that dynamically transition between the buck and boost functions to adapt to various input voltage levels that could be either greater or less than the output voltage required by the load.

FIG. 1 illustrates in a simplified circuit diagram the switching elements, key passive components, and key parasitic elements of a ZVT DC-DC buck power converter 10. Omitted from FIG. 1 for increasing the simplicity of explanation are minor components, minor parasitic elements, the circuits for monitoring output voltage, and the control circuit for controlling the switch timing that are utilized in typical prior ZVT DC-DC buck power converters.

Circuit 10 shown in FIG. 1 contains two primary power switches, S1 and S2, that in conjunction with the output inductor Lo and capacitor Co are used to perform the primary function of the buck converter of supplying energy to the load (represented as a resistive load, Ro) at an output voltage level Vo that is a reduced voltage from the DC input voltage, Vin. Vin represents both the external element that is the source of input voltage (such as a battery or another power supply) to the ZVT power converter and the voltage level across the positive and negative terminals of the Vin input voltage source. Auxiliary switches Sa1 and Sa2 and the auxiliary inductor La are the added components (added to the prior switching converter topology) that are used to accomplish the ZVT functionality. A primary parasitic inductance that contributes to voltage stress on switch S2 is represented in FIG. 1 by inductor Lbyp. The source terminal of S1, the drain terminal of S2 and one terminal of each inductor La and Lo are coupled as illustrated in FIG. 1 to a common node known as the switch node and labeled Switch Node in FIG. 1. The first auxiliary switch Sa1, the second auxiliary switch Sa2, and the auxiliary inductor La are coupled together at an auxiliary node labeled Aux Node. All four switches in the non-limiting, illustrative example buck converter 10 of FIG. 1 (S1, S2, Sa1, and Sa2) are shown implemented as enhancement mode n-channel MOSFETs. Drain to source parasitic capacitances of switches S1 and S2 are important to the circuit description and are illustrated in FIG. 1 as Cds1 and Cds2 respectively. The intrinsic body diode of MOSFET switches is also shown connected between source and drain for all switches (S1, S2, Sa1, and SA2) of FIG. 1.

While enhancement mode n-channel MOSFETs are commonly used as switches in prior DC-DC converters as shown in the example in FIG. 1, other types of transistor switches as well as diode switches in some cases have been employed and can be used to form the buck converter 10, or to form other types of switching power converters.

Circuit 10 illustrated in FIG. 1 accomplishes the primary buck converter function of supplying a reduced voltage to the load (voltage across resistor Ro) by alternatively switching between two primary states. In one of the primary states (defined by switch S1 closed and switch S2 open, which means switch S1 is a transistor that is turned on, while switch S2 is a transistor that is turned off), the input voltage source (Vin) supplies energy to the load, and energy to maintain or increase magnetic energy is also stored in inductor Lo. In the other primary state (defined by switch S1 open and switch S2 closed, which means that switch S1 is a transistor that is turned off, while switch S2 is a transistor that is turned on), current flow from the input (Vin) is blocked, and the magnetic energy stored in inductor Lo is converted to electric energy and supplies energy to the load (resistor Ro). The voltage across the load Ro is maintained in a pre-defined range by varying the relative amount of time the circuit spends in each primary state. Converters that alternate between the two states described above are sometimes described as pulse width modulated (PWM) switching converters because the output Vo is proportional to the input voltage Vin, multiplied by the duty cycle of switch S1 (a ratio of the on time of switch S1 to the total cycle period). Typically, prior known buck converters cycle between these states fairly rapidly (often at hundreds of KHz to 1 MHz and above). In addition to the two primary states, there are brief dead times during the transitions between the two primary states. During the dead times, switches S1 and S2 are simultaneously open, that is the transistors implementing switches S1 and S2 are simultaneously turned off. Dead times are used to insure there is not a high current path across the input voltage source (Vin) directly to ground, which could occur when both S1, and S2, are closed. Prior known approach PWM switching power supplies employ two dead times during each cycle of operation: a first dead time occurs when switch S1 opens and ends when switch S2 closes; and another second dead time occurs when switch S2 opens and ends when switch S1 closes. The ZVT function operates in a small amount of time that begins prior to the beginning of the second dead time with S2 opening, and the ZVT function ends a small amount of time after the second dead time ends with switch S1 closing. The ZVT function does not operate in the first dead time of the buck converter cycle described above (the time between switch S1 opening and S2 closing).

FIG. 2 illustrates in a timing diagram the sequence of switch transition events to operate ZVT functionality for prior known approach ZVT DC-DC buck converters. In FIG. 2 the switching events are labeled t0, t1, t3, and t4. (It should be noted that there is no event labeled t2 in FIG. 2 for increasing simplicity of explanation when comparing the switching event sequence of prior known approach ZVT DC-DC buck converters with the switching event sequence of example arrangements of the present application.) The dead time described above during the time interval between switch S2 opening and switch S1 closing begins at event t1 and ends at event t3 illustrated in FIG. 2.

The open and closed states of each of the four switches (S1, S2, Sa1, and Sa2) illustrated in FIG. 1 are represented in FIG. 2 by the voltage applied to the switch gates (Vg1, Vg2, Vga1, and Vga2 respectively) and shown in four graphs, graph 201 illustrates the voltage on the gate of switch S1, graph 202 illustrates the voltage on the gate of switch S2, graph 203 illustrates the voltage on the gate of switch S3, and graph 204 illustrates the voltage on the gate of switch S4. A voltage annotated as Von applied to a switch gate indicates the switch is closed, and a voltage annotated as Voff indicates the switch is open. The purpose of FIG. 2 is to illustrate of the sequence of switching events, and does not illustrate specific voltage levels, waveform shapes, and time increments.

ZVT functionality for prior known approaches begins at event labeled t0 in FIG. 2 with switch Sa1 turning on as shown in graph 203. In the time leading up to event t0 switch S2 has been closed and switches S1 and Sa2 have been open for a significant portion of the current buck converter cycle. Time progresses to event t1 illustrated in FIG. 2 when switch S2 opens as shown in graph 202. At the next event, t3, switches S1 and Sa2 close as shown in both graphs 201, 204. Switch Sa1 opens at tome t3, as shown in graph 203, and after a short delay to provide the dead time, Sa2 closes just after event t3 as shown in graph 204. At event t4, Sa2 opens as shown in graph 204 to complete ZVT functionality for the current cycle of the buck converter.

The typical prior ZVT buck converter circuit illustrated by circuit 10 in FIG. 1 accomplishes ZVT when the primary power switch S1 transitions from open to closed (S1 turn on as shown in graph 201) at event labeled t3 illustrated in FIG. 2 with zero or near zero volts across it. For the circuit 10 to reach a condition with zero or near zero volts across switch S1 prior to S1 turning on or closing, an L-C resonant circuit is used to increase the voltage at the source terminal of switch S1 (coupled to the node "switch node" in FIG. 1) until approximately equivalent to the voltage at the drain terminal of S1, which is coupled to and approximately equivalent to the input voltage, Vin. The above L-C resonant circuit includes the inductor La and the parallel combination of capacitances Cds1 and Cds2 (the drain to source parasitic capacitances of the switches S1 and S2 respectively) and is referenced herein as the "ZVT resonant circuit." The ZVT resonant circuit is a portion of circuit 10. For prior known approaches, the ZVT resonant circuit resonates only when switch Sa1 is closed and switches S1, S2, and Sa2 are open, which is the time span between events t1 and t3 in FIG. 2. The time span between events t1 and t3 for typical prior known approaches is equivalent to one-quarter cycle of the natural resonant frequency of the ZVT resonant circuit.

While prior known DC-DC converters incorporating the ZVT function typically have lower energy loss and lower voltage stress on transistor switches when compared to the earlier prior DC-DC converters formed without the ZVT function, the ZVT function itself introduces energy loss and voltage stress.

There are two key contributors to energy loss of prior approach ZVT functions that are reduced in the arrangements of the present application. First, energy is lost when auxiliary switch Sa1 turns off when conducting peak current as it transitions through the MOSFET linear region. The second key contribution to energy loss during the ZVT operation is the sum of conduction losses through switches Sa1, Sa2, and S1 and inductor La.

The most significant impact of voltage stress resulting from the ZVT function is on the voltage tolerance required for switch S2 and, therefore, this impacts S2 transistor size and potential cost. The voltage stress on switch S2 is the result of switch Sa1 turning off with peak current flowing through it, causing a voltage spike across switch S2 induced by the parasitic inductance, Lbyp. In addition, there is a voltage spike across Sa1 when it turns off with current flowing through it, due to ringing with parasitic inductances. However, sizing Sa1 for higher voltage tolerance is not a significant impact to potential converter cost, since Sa1 is already a small transistor when compared to the primary power transistors, S1 and S2.

Improvements are thus desirable in the performance and efficiency of ZVT converters. Improvements that reduce the power losses of the ZVT converter over prior known approaches and that reduce voltage stress, enabling the use of smaller and lower cost components to implement the ZVT converter, are of particular importance.

SUMMARY

In various aspects of the present application, the arrangements reduce energy lost during operation of the ZVT DC-DC converter function due to the auxiliary switch transitions and conduction losses in the auxiliary switches, reduce losses in the primary switch, reduce losses in the auxiliary inductor and also the arrangements address the undesirable voltage spike across the secondary switch, allowing a smaller and less costly secondary switch transistor to be used.

In an example method arrangement, method of operating a zero voltage transition circuit includes providing a zero voltage transition circuit, including an input node receiving an input voltage, an output node outputting an output voltage, a switch node, an output inductor coupled in series between the switch node and the output node, an output capacitor coupled between the output node and a ground potential, a first switch for coupling the input node to the switch node, a second switch for coupling the switch node to the ground potential, a first auxiliary switch for coupling the input node to an auxiliary node, a second auxiliary switch for coupling the auxiliary node to the ground potential, and an auxiliary inductor coupled between the auxiliary node and the switch node; operating the zero voltage transition circuit so that the first switch is open, the second switch is closed, the first auxiliary switch is open, and the second auxiliary switch is open; closing the first auxiliary switch to couple the input voltage to the auxiliary node and to the auxiliary inductor; subsequently, monitoring the current flowing through the second switch and when a current is below a current cutoff threshold, opening the second switch; after a first delay period, opening the first auxiliary switch and subsequently closing the second auxiliary switch; and after a second delay period, closing the first switch.

In a further example arrangement, the method above further includes wherein a resonant period time tr is determined by values of the auxiliary inductor, and parasitic capacitances in the first switch and the second switch. In still another example arrangement, in the above described methods, wherein the first delay period is approximately one-sixth tr. In still another example arrangement, in the above described methods, wherein the second delay period is approximately one-twelfth tr.

In yet another example arrangement, the above described methods are performed, wherein the first auxiliary switch is opened when the voltage at the switch node is equal to or greater than one half the voltage at the input node. In still another example arrangement, in the above described method, wherein when the first switch is closed, a voltage across the first switch is approximately zero. In still another example arrangement, in the above described methods, the cutoff current for the second switch corresponds to a current flowing in the second switch that will result in the voltage at the switch node being greater than or equal to a voltage of one-half the input voltage when the first auxiliary switch is opened.

In yet another arrangement, the above described methods are performed and further including comparing the voltage at the switch node to the voltage at the input node when the first switch is closed; and responsive to the comparing, adjusting the cutoff current threshold for the second switch.

In still another method arrangement, the above described methods are performed and further include iteratively performing operating the zero voltage transition circuit so that the first switch is open, the second switch is closed, the first auxiliary switch is open, and the second auxiliary switch is open closing the first auxiliary switch to couple the input voltage to the auxiliary node and to the auxiliary inductor; subsequently monitoring the current flowing through the second switch and when the current is below a threshold, opening the second switch; after a first delay period, opening the first auxiliary switch and subsequently closing the second auxiliary switch; and after a second delay period, closing the first switch.

In still another arrangement, the above described methods are performed, wherein providing the zero voltage transition circuit further includes providing transistors that implement a buck converter. In yet another arrangement, the above described methods are performed wherein providing the zero voltage transition circuit further includes providing MOS transistors implementing the first switch, the second switch, the first auxiliary switch, and the second auxiliary switch.

In another example arrangement, circuitry for a zero voltage transition switching converter includes a first switch coupled between an input node for receiving an input voltage and a switch node; a second switch coupled between the switch node and a ground node for coupling to a ground potential; an output node for outputting a voltage to a load; an output inductor coupled between the switch node and the output node; an output capacitor coupled between the switch node and the ground node; an auxiliary circuit for enabling a zero voltage transition in turning on the first switch, including a first auxiliary switch coupled between the input node and an auxiliary node, a second auxiliary switch coupled between the auxiliary node and the ground node, an auxiliary inductor coupled between the auxiliary node and the switch node; and a controller coupled to each of the first switch, the second switch, the first auxiliary switch, and the second auxiliary switch, the controller configured to operate the zero voltage transition switching converter such that the first switch is open and the second switch is closed, subsequently, closing the first auxiliary switch, subsequently identifying when a current in the second switch falls below a cutoff current threshold; turning off the second switch, after a first delay period, opening the first auxiliary switch and then closing second auxiliary switch, and after a second delay period, closing the first switch.

In yet another example arrangement, in the above described circuitry, the controller is further configured to monitor the voltage at the switch node when the first switch is turned off, and to adjust the cutoff current threshold for the second switch responsive to the monitoring.

In still a further example arrangement, in the above described circuitry, wherein a resonant time period tr is determined by values of the auxiliary inductor, and parasitic capacitances in the first switch and the second switch.

In yet a further example arrangement, in the above described circuitry, wherein the first delay period is a time that is approximately one sixth of tr. In another example arrangement, in the above described circuitry, wherein the second delay period is a time that is approximately one twelfth of tr. In yet a further example arrangement, in the above described circuitry, wherein when the first auxiliary switch is turned off, the voltage at the switch node is greater than or equal to one half of the voltage at the input node. In an additional alternative arrangement, in the above described circuitry, the first switch, the second switch, the first auxiliary switch and the second auxiliary switch each comprise MOS transistors.

In yet another additional example arrangement, an integrated circuit zero voltage transition converter includes a semiconductor substrate; a zero voltage transition converter on the semiconductor substrate further including a first switch coupled between an input node for receiving an input voltage and a switch node, a second switch coupled between the switch node and a ground node for coupling a ground potential, an output node for outputting a voltage to a load; an output inductor coupled between the switch node and the output node; and an output capacitor coupled between the switch node and the ground node; an auxiliary circuit on the semiconductor substrate configured to enable a zero voltage transition in closing the first switch, including a first auxiliary switch coupled between the input node and an auxiliary node, a second auxiliary switch coupled between the auxiliary node and the ground node, and an auxiliary inductor coupled between the auxiliary node and the switch node; and a controller on the semiconductor substrate coupled to each of the first switch, the second switch, the first auxiliary switch, and the second auxiliary switch, configured to operate the zero voltage transition switching converter such that the first switch is open and the second switch is closed, subsequently closing the first auxiliary switch, subsequently identifying when a current in the second switch falls below a cutoff current threshold; then opening the second switch, after a first delay period, opening the first auxiliary switch and then closing second auxiliary switch, and after a second delay period, closing the first switch.

In still another example arrangement, in the integrated circuit described above, each of the first switch, the second switch, the first auxiliary switch and the second auxiliary switch further includes a MOS transistor.

Use of the novel arrangements provides zero voltage transition power converters which have reduced resonant energy losses due to improved switching sequences and timing control in the auxiliary and primary switch devices, reducing current flow in linear regions of switch operation, and reducing voltage tolerance requirements on certain ones of the switches, improving the circuit area required and increasing circuit performance.

BRIEF DESCRIPTION OF THE DRAWINGS

For a more complete understanding of the illustrative examples of aspects of the present application that are described herein and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the illustrative example arrangements and are not necessarily drawn to scale.

DETAILED DESCRIPTION

The making and using of example illustrative arrangements that form aspects of the present application are discussed in detail below. It should be appreciated, however, that aspects of the present application provide many applicable inventive concepts that can be embodied in a wide variety of specific contexts. The specific arrangements discussed are merely illustrative of specific ways to make and use the various aspects of the present application, and the examples described do not limit the scope of the specification, or the scope of the appended claims.

For example, when the term "coupled" is used herein to describe the relationships between elements, the term as used in the specification and the appended claims is to be interpreted broadly, and is not to be limited to "connected" or "directly connected" but instead the term "coupled" may include connections made with intervening elements, and additional connections may be used between any elements that are "coupled".

Multiple comparisons of the arrangements of the present application and prior approaches are provided below. In all cases, these comparisons are based on operating conditions, voltage source characteristics, and load characteristics being approximately identical for both the present application and prior approaches. Further, the comparisons are based on approximately equivalent circuit operations of the arrangements of the present application and prior approaches, except where the novel aspects of the present application result in an aspect of the arrangement or circuit operation to differ as described below. The comparisons below of the various arrangements of the present application and prior approaches are not limited to a specific circuit, operating condition, voltage source characteristic, or load characteristic. The novel aspects of the arrangements of the present application can be incorporated in and provide benefit to a broad range of switching power converters employing ZVT technology.

Figure 1:
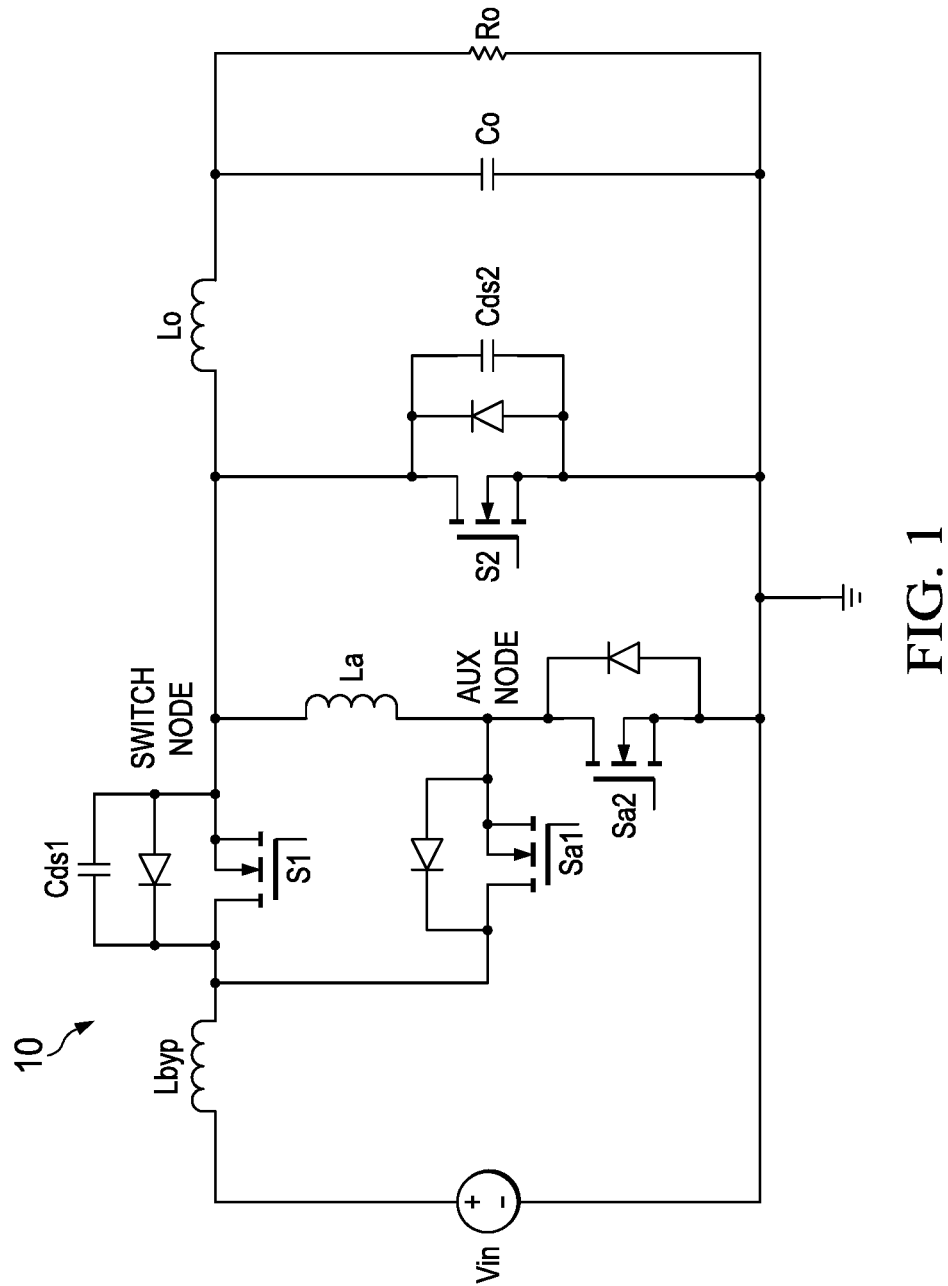
FIG. 1 depicts a simplified circuit diagram illustrating the switching elements, key passive components, and key parasitic elements of a typical ZVT DC-DC buck power converter applicable to the arrangements of the present application.
Figure 2:
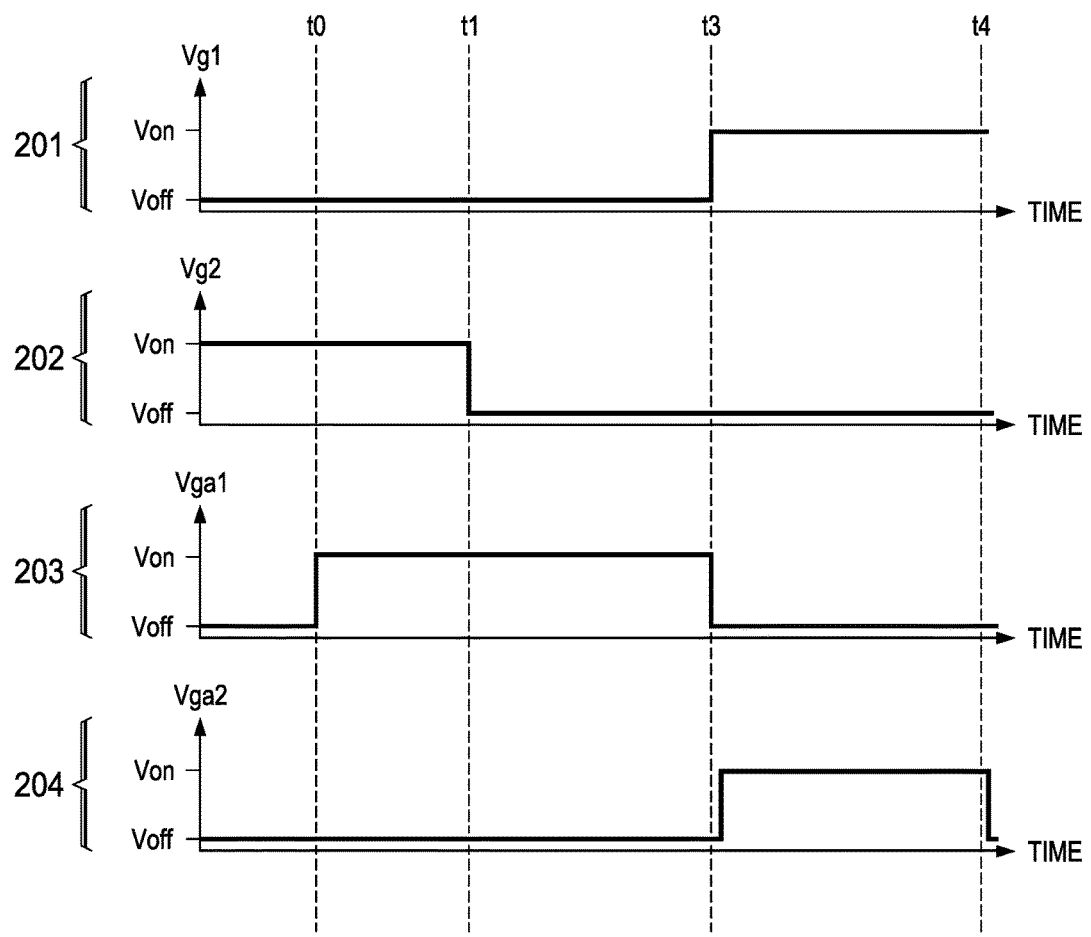
FIG. 2 depicts a group of timing diagrams illustrating switch transition events and sequencing to operate ZVT functionality for prior known approaches.

As discussed above, FIG. 1 illustrates in a simplified circuit diagram 10 the switching elements, key passive components, and key parasitic elements of a ZVT DC-DC buck power converter where novel arrangements of the present application can be incorporated and the advantages achieved can be accrued. For the purposes of diagram simplification, omitted from FIG. 1 are minor components, minor parasitic elements, and the circuits for monitoring output voltage and controlling the switch timing that are present in prior approaches and example arrangements of the present application. A novel aspect of the arrangements of the present application is novel sequencing and timing of transitions for the switches depicted in circuit 10. Consequently, circuit 10 is used herein for explanation of the switching events of typical known ZVT DC-DC buck power converters as well as for the illustration of arrangements of the present application. The novel switch transition sequencing and timing employed in arrangements of the present application results in improved power efficiency and enables improved ZVT power converters with reduced semiconductor die area for switch implementation as described herein.

The novel switch transition sequencing and timing employed in the arrangements of the present application occurs during the operation of the ZVT function and does not significantly impact the operation of circuit 10 during the remainder of the power supply cycle. Consequently a description of the full power supply cycle is not included.

Figure 3:
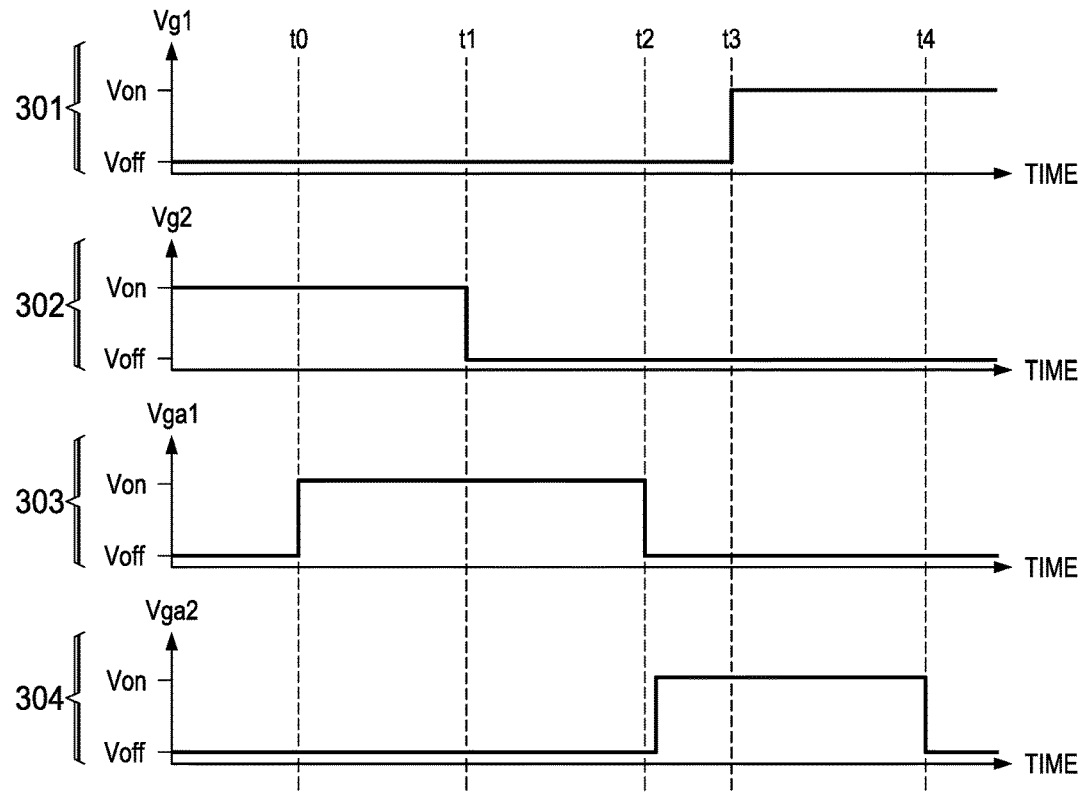
FIG. 3 depicts a group of timing diagrams illustrating switch transition events and sequencing to operate ZVT functionality for arrangements of the present application.

FIG. 3 illustrates in a timing diagram the sequence of switch transition events to operate ZVT functionality for an example arrangement of the present application. In FIG. 3, the switching events are labeled t0, t1, t2, t3, and t4.

The open and closed states of each of the four switches (S1, S2, Sa1, and Sa2) illustrated in FIG. 1 are represented in FIG. 3 by the voltage applied to the switch gates (Vg1, Vg2, Vga1, and Vga2 respectively). Graph 301 illustrates the voltage Vg1 at the gate terminal of switch S1; graph 302 illustrates the voltage Vg2 at the gate terminal of switch S2; graph 303 illustrates the voltage at the gate terminal of the switch Sa1; and graph 304 illustrates the voltage at the gate terminal of switch Sa2. A voltage annotated as Von applied to a switch gate indicates the switch is closed because a transistor is on, and a voltage annotated as Voff indicates the switch is open because a transistor is off. The purpose of the graphs 301, 302, 303 and 304 in FIG. 3 is to illustrate the sequence of switching events, and FIG. 3 does not illustrate specific voltage levels, waveform shapes, and time increments. For both the arrangements of the present application and for the prior approaches there is a brief dead time between switch Sa1 turn off and switch Sa2 turn on. This dead time is used to insure there is not a high current path from across the input voltage source, Vin. The dead time between switch Sa1 turn off and switch Sa2 turn on does not significantly impact circuit 10 functionality. Consequently switch Sa1 turn off, the intervening dead time, and switch Sa2 turn on are illustrated as occurring in a single event (at time t2) in FIG. 3 for further simplicity of explanation.

ZVT functionality for the example arrangements of the present application begins with the event labeled t0 in FIG. 3, with switch Sa1 turning on, as shown in graph 303, while switch S2 remains closed and switches S1 and Sa2 remain open. In FIG. 3 time progresses to event t1 when switch S2 opens as shown in graph 302. At the next event, t2, as shown in FIG. 3, switch Sa1 opens as illustrated in graph 303, and after a short delay that fulfills the dead time requirement, switch Sa2 closes as shown in graph 304. (In sharp contrast to the arrangements of the present application, in prior approaches, the ZVT circuits do not employ a switching event at time t2, as previously stated.) As shown in FIG. 3, at event t3 for the arrangements of the present application, switch S1 is closing as is illustrated in graph 301 at time t3. At event t4, switch Sa2 opens as shown in graph 304 to complete ZVT functionality for the current cycle of the buck converter.

Additionally, the waveform and timing diagrams provided herein are not annotated with voltage and current values and time increments since specific values depend on a how a specific example arrangement is made. When waveforms are compared herein, the same relative voltage, current, and time scales are used.

Provided herein, for each successive span of time between the above stated switching events, is a description of the ZVT functionality and the novel switch transition sequencing and timing employed by the arrangements of the present application within the respective time span, as well as a comparison to prior approaches. In addition, a description of the circuit functionality to control the novel switch sequencing and timing is provided below.

The first time span during the operation of the ZVT function is between events t0 and t1 as shown in FIG. 3. The ZVT function starts during each buck converter cycle at event t0. In the time leading up to t0, both the prior approach and the present application operate similarly and are in a state with switch S1 open and switch S2 closed and switches Sa1 and Sa2 open. At event t0 switch Sa1 closes, allowing current to flow through the auxiliary inductor La, which ramps from zero amperes until the current flowing in inductor La is approximately equivalent to the current flowing through inductor Lo. Simultaneously, the current flowing in the closed switch S2 ramps to zero or near zero. As stated above, the behavior of circuit 10 for both the present application and for the prior approaches is similar for the time interval starting at event t0 and ending at event t1, with an exception being that the time at which t1 occurs after event t0 is adjusted by the control circuit of the arrangements of the present application, as is further described below.

The adjustment to the time at which event t1 occurs can be performed in order to modify the resonant trajectory of the ZVT resonant circuit, such that the switch node voltage will be equal or nearly equal to the input voltage, Vin, at event t3 (ZVT functionality for subsequent events is described below). Adjusting the resonant trajectory on an on-going basis allows the ZVT function to adapt to dynamic changes in load and other operating conditions. The adjustment to the time at which t1 (following the events at t0) occurs is accomplished in the arrangements indirectly by monitoring and adjusting the current Is2 flowing through switch S2 when it is turned off at event t1. To accomplish the adjustment of the S2 turn off current, the switch node voltage is measured at event t3. If the switch node voltage is equal to or greater than Vin at time t3, the target value (the current through S2 when turned off, or IS2-off) for the S2 turn off current is incrementally reduced. If the switch node voltage is less than Vin, IS2-off is incrementally increased. During the operation of the ZVT function of the immediately following buck converter cycle, the current in switch S2 is monitored between events t0 and t1 and compared to IS2-off (set in the previous cycle). In the arrangements, the switch S2 is turned off when the current IS2 is equal to or less than IS2-off.

The second time span during the operation of the ZVT function as shown in FIG. 3 is between events t1 and t2. For both the present application and prior approaches, switch S2 opens at event t1 with zero or near zero current flowing through it, as shown in graph 302. Switches S1 and Sa2 remain open at t1. With only switch Sa1 closed, the inductor La resonates with the parallel combination of the parasitic drain to source capacitances, Cds1 and Cds2, of switches S1 and S2 respectively (the ZVT resonant circuit). In example arrangements of the present application, event t2 occurs at a time that is ⅙ tr after event t1, when the switch node reaches a voltage greater than ½ Vin, at which time Sa1 is opened and Sa2 is closed (after a short dead time delay) as shown in FIG. 3 in graphs 303, 304 at time t2 and just after time t2.

The natural resonant period of the ZVT resonant circuit is referenced herein as time "tr."

In sharp contrast to the operation of the arrangements of the present application, in the prior approach ZVT converters, the event t2 does not occur. Prior approach converters operate such that the ZVT resonant circuit continues resonating on the same trajectory until the switch node (and, therefore, the source terminal of switch S1) is equivalent or nearly equivalent to the input voltage, Vin, at event t3, when S1 is then closed with zero or nearly zero volts across it, and resonance is then halted by opening switch Sa1 and closing switch Sa2.

Figure 4:
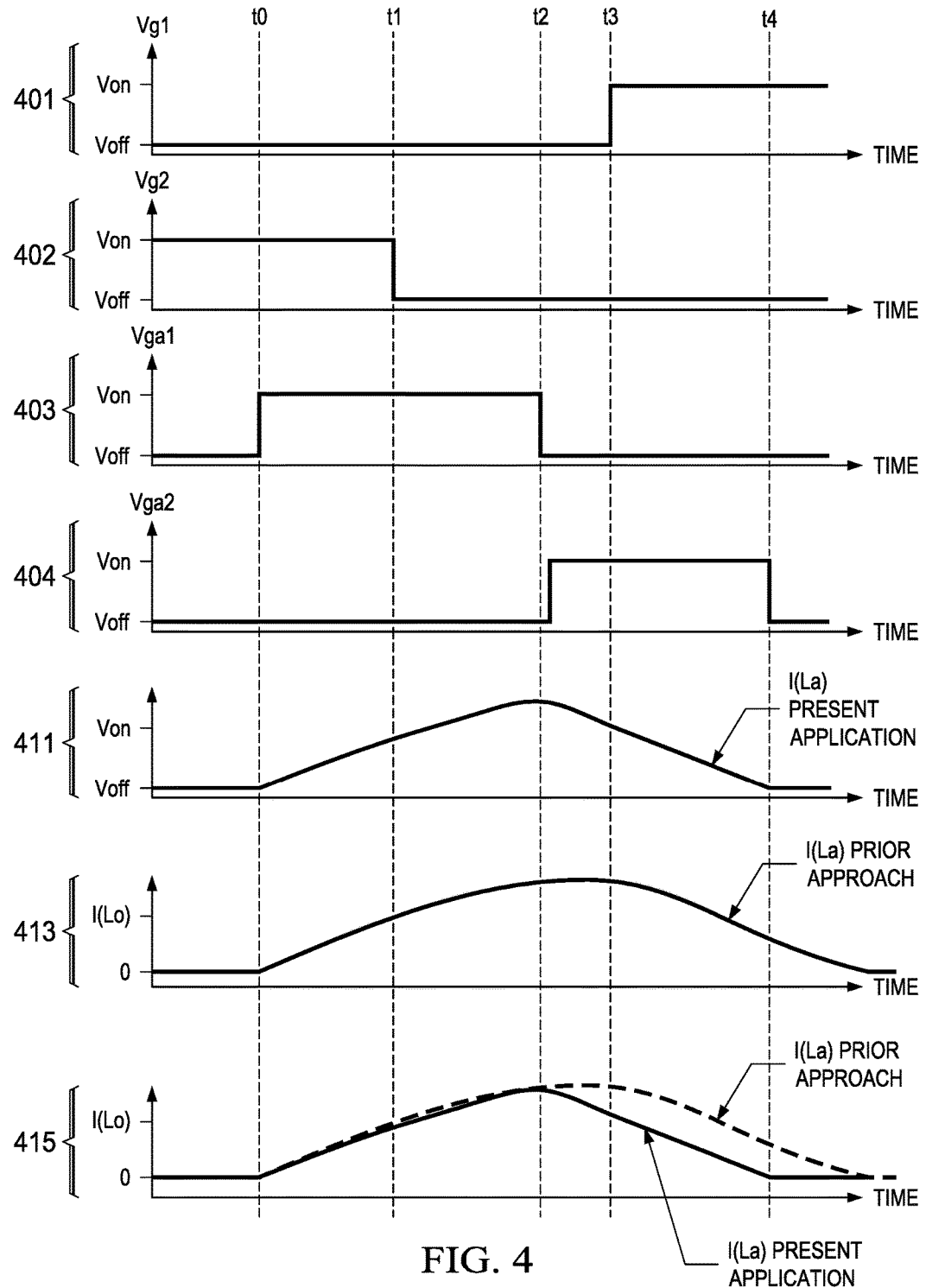
FIG. 4 depicts a group of waveform plots comparing current flow in a key element of the arrangements of the present application to current flow in prior approaches.

FIG. 4 illustrates in graphs the current in La, labeled I(La), for the example arrangements of the present application and also presents graphs comparing the current obtained to the corresponding current obtained in the prior known approaches for ZVT converters. The switching events t0, t1, t2, t3, and t4 shown in FIG. 4 are duplicated from FIG. 3 for clarity of illustration. The time scales of FIG. 4 for I(La) waveforms are the same for both the arrangements of the present application and the prior approach.

Graphs 401, 402, 403, and 404 of FIG. 4 correspond to the graphs 301, 302, 303 and 304 in FIG. 3 and depict the gate voltages on the switches S1, S2, Sa1, and Sa2 for the buck converter circuit 10 in FIG. 1, for example, using an example sequencing arrangement of the present application at the events t0, t1, t2, t3 and t4.

In FIG. 4, the current flowing in the inductor La is shown on separate graphs 411 for the present application and 413 for the prior approach, as well as graph 415 which shows the current in inductor La for both the arrangements of the present application and that of the prior approach overlaid on the same set of axes. Graph 415 is presented to illustrate that arrangements of the present application operate at lower inductor La current for a shorter time period during the time span between events t2 and t4. For the overlaid waveform diagram 415, a dashed line is used to illustrate current I(Lo) for the present arrangement and for the prior approaches where the waveforms differ significantly. In graphs 411, 413 and 415 of FIG. 4, the current through Lo is represented by fixed grid line labeled I(Lo). In practice, I(Lo) is not a fixed value and is load dependent. For simplicity of explanation, I(Lo) is shown as a fixed value.

An additional difference between the present application and prior approaches is that in the arrangements of the present application, a voltage spike occurs when switch Sa1 opens at event t2 with current flowing through it, due to ringing with parasitic inductances. In prior approach buck converters, this voltage spike appears only across switch S2, since it is open and switch S1 is closed when the spike occurs. In contrast, in the arrangements of the present application, the arrangements operate by opening switch Sa1 with both S1 and S2 open and before the drain to source capacitance of S1 (Cds1) is fully discharged, distributing the voltage spike across both switches S1 and S2 in series. Specifically, in the operations of the novel arrangements of the present application, the series combination of the parasitic drain-source capacitances Cds1 and Cds1 of switches S1 and S2 respectively form a capacitive divider across which the voltage spike occurs. Dividing the voltage spike across both S1 and S2 advantageously reduces the voltage tolerance requirement of switch S2 when compared to the voltage tolerance requirement for the same switch in prior approaches. The voltage tolerance requirement of the switch S1 is not increased in the novel arrangements, due to the fact that the spike across S1 when Sa1 opens in the example arrangements is less than the voltage across S1 at other times during the operation of the buck converter.

Further contrasting the prior approach ZVT buck converter with the arrangements of the present application, in some arrangements incorporating the novel features, the switch Sa1 can require a higher voltage tolerance than in the prior known approaches. In other arrangements, however, the voltage tolerance and the size of this transistor Sa1 can be the same as for the prior approaches. However, in the ZVT buck converters, switch Sa1 is a significantly smaller transistor than the high power switches S1 and S2, so that the even if, in certain cases, the size of Sa1 is increased, use of the novel arrangements results in a relatively small die area increase for the entire buck converter, and this potential die area increase can also easily be offset by a reduced die area for the most larger transistor that forms switch S2.

Yet another contrast between the present application and the prior approach ZVT converters that results from the novel approach of opening switch Sa1 prior to the time that the switch S1 source terminal voltage becomes approximately equal to the input voltage, Vin, is the possibility of switching Sa1 off more rapidly. In some arrangements the transistor Sa1 can be switched off more rapidly than in the prior known approach, while in other arrangements the turn off time can be retained as before. A more rapid turn off of switch Sa1 with current flowing through it will further reduce energy losses, since the amount of time the Sa1 transistor is conducting in the linear (resistive) region is reduced by the rapid turn off. A more rapid turn off of Sa1 also increases ringing with parasitic inductances, consequently increasing the voltage tolerance requirement of Sa1 and therefore requires a larger die area. For the arrangements of the present application, however, the potential exists to completely off-set any die area increase due to the increased size of the relatively small transistor Sa1 with the further reduced die area requirement of the much larger transistor S2 that can be achieved due to the new lower voltage tolerance requirement of S2, as described above.

The third time span during the operation of the ZVT function for the present application is between events t2 and t3. As stated above in the description of FIG. 3, event t2 of the present application occurs when the transition of switch Sa1 from closed to open occurs, and switch Sa2 transitions from open to closed shortly afterwards, with switches S1 and S2 remaining open. When switch Sa1 opens and switch Sa2 closes, the ZVT resonant circuit configuration is changed and the voltage across inductor La reverses. Current flow through inductor La will continue in the same direction, and resonance will continue on a different trajectory with the current in La resonating towards zero, resulting in the switch node continuing to charge. The energy stored in La at event t2 is sufficient to continue charging the switch node until it becomes approximately equivalent to the input voltage, Vin, provided the event at time t2 occurs with the switch node voltage still sufficiently above ½ the Vin voltage level. It should be noted that for an ideal circuit, if t2 were to occur when the switch node is exactly ½ Vin, then there should be sufficient energy stored in inductor La for the switch node voltage to reach Vin. However, in the example arrangements of the present application, t2 should occur with the switch node at a voltage greater than ½ Vin so as to accommodate component parameter variance and non-ideal circuit characteristics. The switch node voltage becomes approximately equivalent to Vin at a time that is 1/12 tr after the event t2, at which time event t3 occurs, with S1 closing. This sequence is shown in graphs 401, 402, 403, and 404 at time t3.

Figure 5:
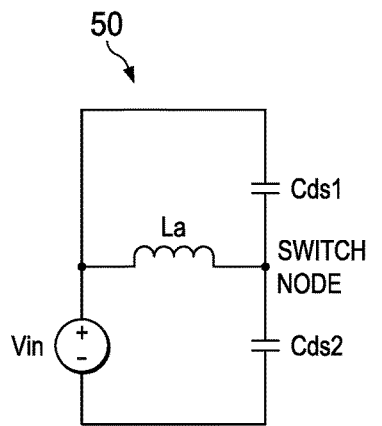
FIG. 5 depicts an ideal equivalent circuit diagram of the ZVT resonant circuit of the arrangements in an aspect of the present application.
Figure 6:
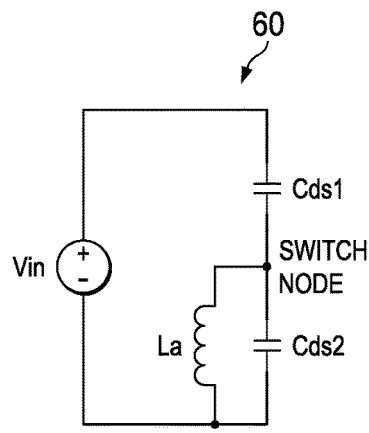
FIG. 6 depicts an ideal equivalent circuit diagram of the ZVT resonant circuit in an alternative arrangement that is another aspect of the present application.

FIG. 5 illustrates in a simplified circuit diagram an equivalent ideal ZVT resonant circuit for the arrangements of the present application in the configuration during the span of time from event t1 to t2 described above (circuit 50). FIG. 6 illustrates in another simplified circuit diagram the equivalent ideal ZVT resonant circuit for the present application in the configuration for the span of time from event t2 to t3 described above (circuit 60). Both circuits 50 and 60 illustrate a portion of circuit 10 of FIG. 1 with switches S1, S2, Sa1, and Sa2 in the states described above for the respective time spans. For simplicity, in the diagrams for circuits 50 and 60, the switches Sa1 and Sa2 are treated as ideal and shown as interconnect conductors when closed and are simply not shown when open.

As described above, during the time period between events t2 and t3 for arrangements of the present application, stored energy in inductor La is used to charge the switch node from a level greater than ½ Vin to Vin. In sharp contrast to the novel arrangements, for ZVT converters using prior approaches, the converters utilize energy from the power converter input voltage source, Vin, to charge the switch node to be approximately equivalent to the input voltage, Vin. Consequently, more energy is stored in La and current is higher in La when switch S1 closes at t3 during operation of prior approaches than for the arrangements of the present application. Greater stored energy in La and higher current through La result in greater energy losses for the prior approaches.

As stated above the event t2 of the novel arrangements is not part of the operation of prior approach converters. Therefore, prior approach ZVT resonant circuits continue resonance on the same trajectory for the full time span from t1 to t3. In contrast, for the example arrangements for the present application, the resonant trajectory is modified at event t2 as described above.

As illustrated in FIG. 4, compared to prior approaches, current through switch Sa1 is lower when Sa1 turns off during operation of example arrangements of the present application, due to ramping the switch node voltage to a level greater than ½ Vin. The turn off of switch Sa1 is performed early when compared to the prior approaches, as opposed to waiting for the switch node voltage to be approximately equivalent to Vin. As a result energy lost by switch Sa1 while it is conducting in the transistor linear region during the transition from on to off for the transistor Sa1 is much lower for arrangements of the present application.

The fourth and final time span during the operation of the ZVT function is between events t3 and t4. During the period of time between events t3 and t4 operation of the present application and prior approaches is similar in that switch S1 turns on at event t3, and current in inductor La ramps down to zero, at which time Sa2 is turned off at event t4, ending the operation of the ZVT function for the current buck converter cycle. After switch S1 closes, the portion of the current in La that exceeds the current in Lo is returned to the source and the remainder of the current in La flows into Lo to supply the load.

There are three key differences between the prior approach and the present application in the time period between events t3 and t4. The first key difference is that switch Sa1 opens and switch Sa2 closes at t3 in prior approaches while for the present application Sa1 opens and Sa2 closes prior to the event t3 (at t2) as described above. The second key difference is that a smaller fraction of the energy stored in inductor La is returned to the source than in prior approaches, reducing energy losses for the present application. The third key difference is that the inductor La current reaches its peak at t3 for prior approaches, while for the present application the peak current through La is lower and the peak current is achieved earlier in time (at event t2), resulting in the time period from t3 to t4 being significantly shorter for the present application. Additionally, the time from t2 to t4 for the present application is shorter than the time from t3 to t4 for prior approaches.

Compared to prior approaches, the operation of example arrangements of the present application results in switches Sa1, Sa2, and S1 and inductor La each conducting for shorter amounts of time with lower RMS current levels, resulting in significantly lower energy loss. The advantages that accrue by use of the novel arrangements can be explained as follows: RMS current through Sa1, Sa2, S1, and La are lower for the arrangements of the present application since Sa1 turns off prior to the switch node voltage reaching Vin, resulting in lower peak current in La, Sa1, and Sa2. Conduction time for switch Sa1 is reduced since it turns off earlier than in prior approaches, turning off prior to the switch node voltage reaching Vin. Since the peak current in La is lower for the arrangements of the present application, the current in La ramps to zero in less time, resulting in lower RMS current in switch S1. In addition, since the current in La ramps to zero more rapidly, the conduction times for Sa2, S1, and La are also reduced.

Figure 7:
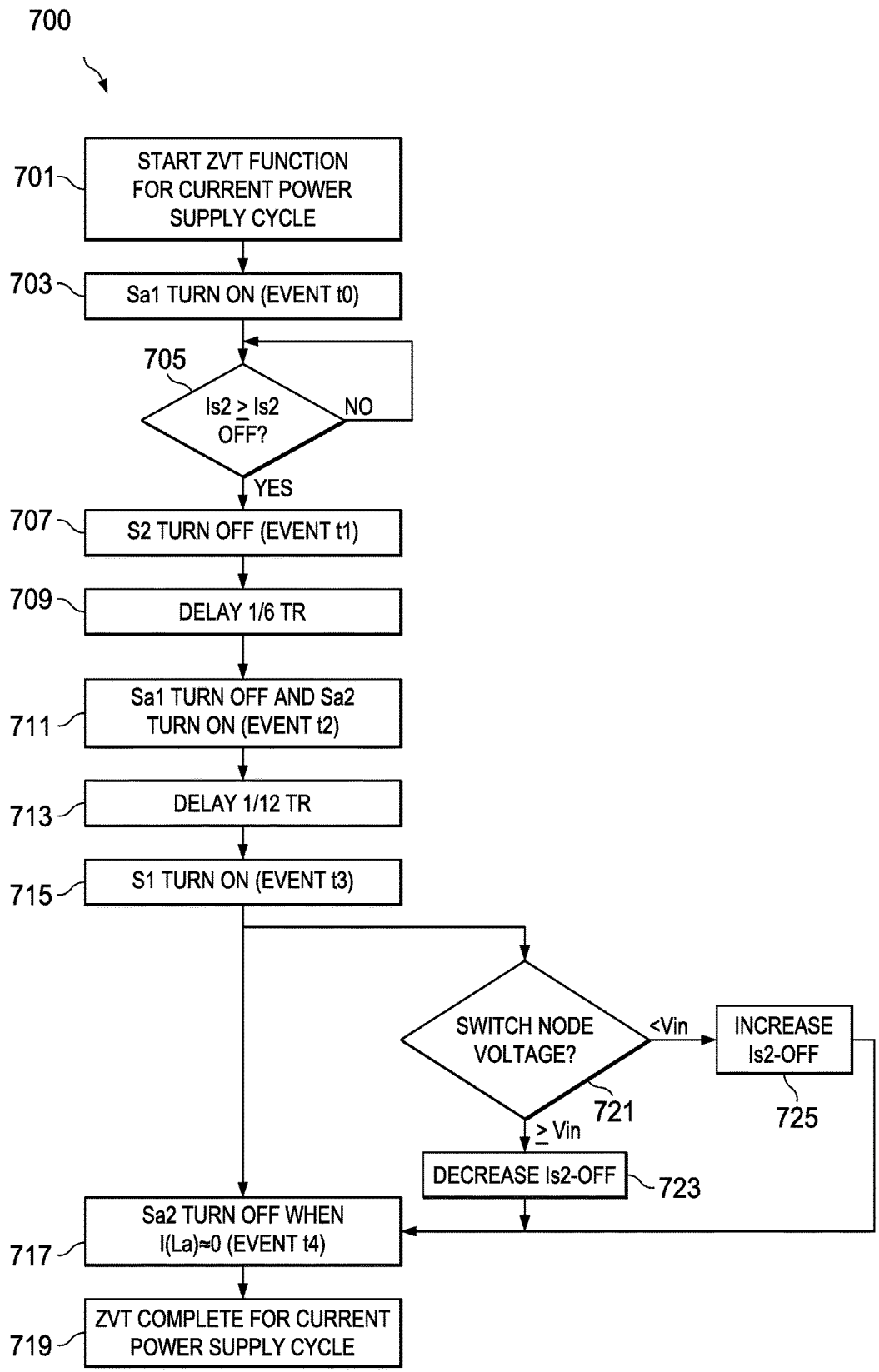
FIG. 7 depicts a flow chart illustrating a sequence of switch transitions in a method arrangement of the present application.

FIG. 7 illustrates in a flow chart the steps of a method arrangement for operating the following novel switch sequencing and timing for the ZVT converter of the present application. At step 701, the zero voltage transition function of the buck converter begins. At step 703, the event described above at t0 occurs, and the auxiliary switch Sa1 is turned on. At step 705, a decision loop begins. Current flowing through switch S2 is monitored and when it reaches a target current, indicating a time for switch S2 to turn off, the method transitions to step 707.

At step 707, the switch S2 is turned off and the novel features of the arrangements are implemented in the method. At step 709, a delay following the switch S2 turn off of ⅙ the resonant period tr is allowed to expire, then the method 700 transitions to step 711. At step 711, the auxiliary switch Sa1 is turned off, and the auxiliary switch Sa2 is then turned on, the event t2 described above. The method then transitions to step 713 where another delay is allowed to expire, this one of 1/12 the resonant time tr. At step 715, event t3 is performed, and main switch S1 is turned on. At this point in the method, steps 721, 723 and 725 are performed, and the voltage at the switch node is measured at step 721, and based on this measurement, the target current for switch S2, Is2, used at step 705 above, is adjusted so that it will more closely match the ideal behavior in the next ZVT cycle. At step 723, if the voltage at the switch node is greater than Vin at the time S1 is turned on, at event t3, then the current target is decreased. At step 725, in contrast, if the switch node voltage at event t3 is less than Vin, the target current is increased.

At step 711 the second auxiliary switch Sa2 is turned off when the current in inductor La is approximately equal to zero, at event t4 as described above, which ends the ZVT portion of the power supply cycle, at step 719.

Figure 8:
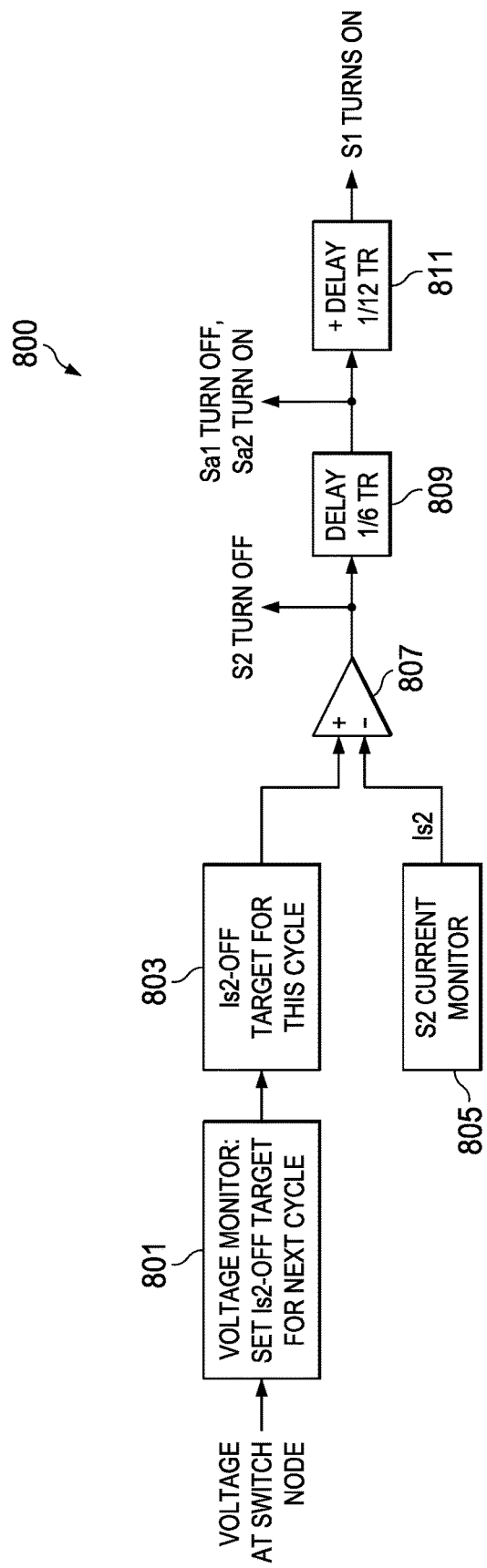
FIG. 8 depicts a block diagram illustrating the novel switch sequencing and timing control for example arrangements of the present application.

FIG. 8 illustrates in a block diagram 800 the novel switch sequencing and timing control blocks used in one possible example for implementing the arrangements of the present application. As previously described, the switch node voltage is monitored at the event t3 in each buck converter cycle, this is shown in FIG. 8 in block 801. The target value (Is2-off) for the current flowing through switch S2 when it is turned off in the subsequent buck converter cycle is set in block 803, as illustrated in FIG. 8. The current through S2 in each buck converter cycle is monitored by block 805, and this value is compared by comparator 807 to the Is2-off target value set in the previous buck converter cycle, and when the two values are approximately equivalent, S2 is turned off (event t1). As described above and illustrated in FIG. 7, the switch S2 turn off is followed by a fixed delay of $\frac{1}{6}$ tr, implemented in block 809, after which event t2 occurs turning off Sa1, and then turning on Sa2 after a short deadtime delay. Event t2 is followed by a fixed delay of $\frac{1}{12}$ tr implemented in block 811, after which S1 is turned on at event t3.

Both FIG. 7 and FIG. 8 are illustrating only the novel aspects of switch sequencing and timing control for the novel ZVT part of the power converter cycle and do not illustrate the sequencing and timing control for the entire ZVT function or for the remaining operations of the converter.

Figure 9:
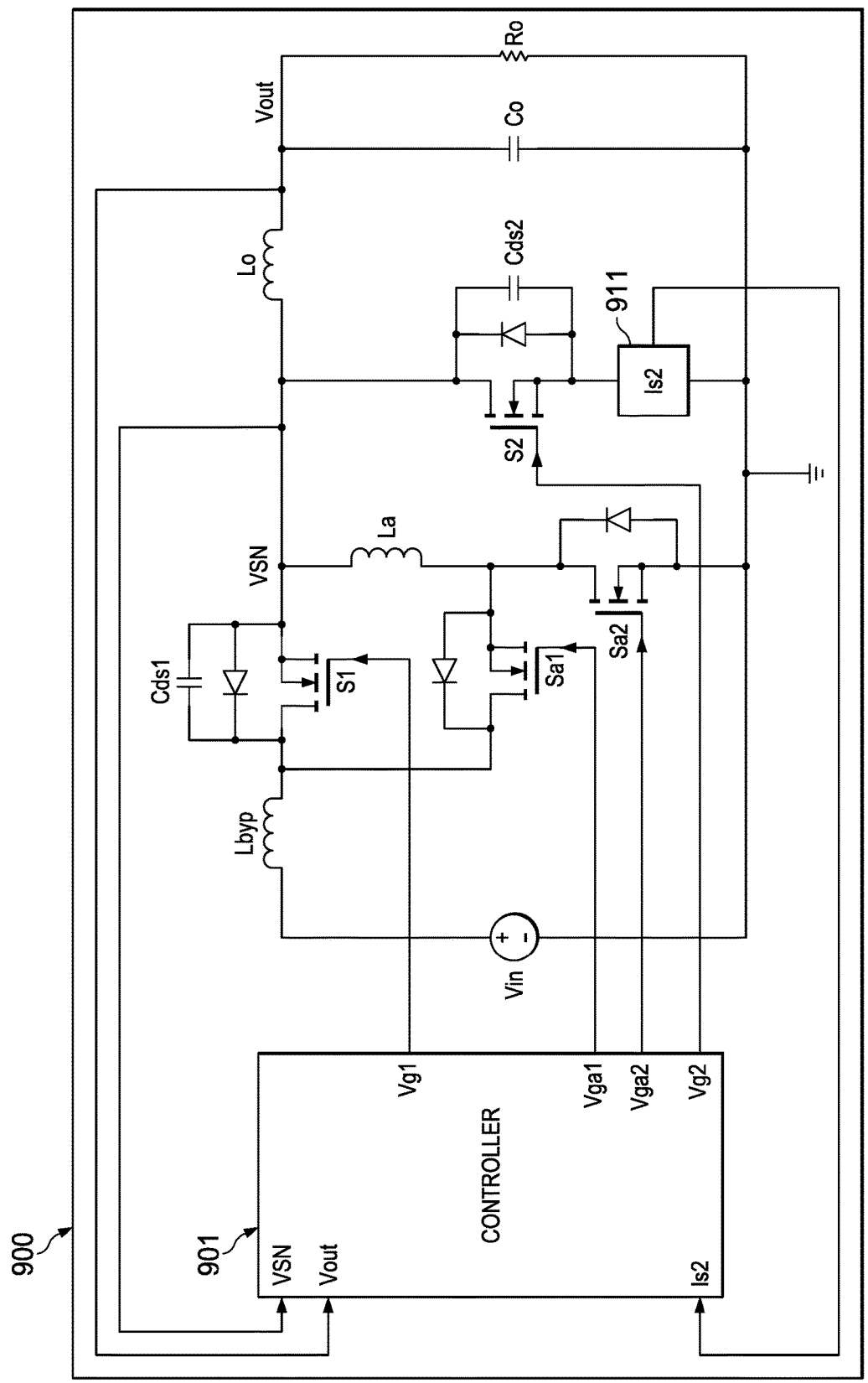
FIG. 9 depicts in an additional circuit block diagram an example integrated circuit incorporating arrangements of the present application.

FIG. 9 depicts in another block diagram an integrated circuit 900 that provides a ZVT power converter in a buck circuit topology that incorporates the arrangements of the present application. In the integrated circuit 900, the typical buck converter of FIG. 1 is again shown, with an input voltage Vin, a pair of primary switches S1, S2, which with the output inductor Lo, capacitor Co, and resistance Ro, provide a voltage Vout to a load (not shown) coupled to the output. To provide the zero voltage transition function for the converter, auxiliary switches Sa1 and Sa2, and inductor La, are used to control the voltage at the source terminal of switch S1 and to allow it to be turned on when the source-drain voltage is approximately zero.

In FIG. 9, a controller 901 provides the gate control voltages Vg1, Vg2 to the primary switches S1, S2 and also the gate voltages Vga1, Vga2, to the auxiliary switches Sa1, Sa2. Controller 901 implements the switching sequences needed to operate the buck converter on integrated circuit 900 including the delayed turn off of the auxiliary switch Sa1, and the delayed turn on of switch S1 after that event, that are used in the novel arrangements of the present application to improve the performance of the ZVT converter. Controller 901 also controls the gate voltages for other portions of the converter operating cycle to regulate the output voltage. The inputs to controller 901 include the output voltage, Vo, the switch node voltage, VSN, and the current Is2 (or a voltage equivalent) provided by current monitor 911.

Controller 901 can be implemented in a variety of ways, for example as circuits including, as non-limiting examples, a microcontroller, microprocessor, CPU, DSP, or other programmable logic, as a dedicated logic function such as a state machine, and can include fixed or user programmable instructions. Further, as an alternative arrangement, controller 901 can be implemented on a separate integrated circuit, with the switches S1, S2, Sa1, Sa2, and the remaining passive analog components, implemented on a stand-alone integrated circuit. Controller 901 can be implemented as an application specific integrated circuit (ASIC), using field programmable gate arrays (FPGAs) or complex programmable logic devices (CPLDs) and the like. The sequencing and timing control of the novel arrangements can be implemented as software, firmware or hardcoded instructions. Delay lines and counters and the like can be used to determine the needed delays $\frac{1}{6}$ tr, $\frac{1}{12}$ tr, as determined by a particular hardware designer. Because the novel arrangements herein are implemented as changes in the sequence of gate signals applied to the transistors of a converter, the arrangements can be utilized in existing converter circuits by the modification of software and some sensing hardware, and thus the arrangements can be used to improve the performance of prior existing systems without the need for entire replacements of the converter hardware.

Although the example arrangements that form aspects of the present application have been described in detail, it should be understood that various changes, substitutions and alterations can be made herein without departing from the spirit and scope of the application as defined by the appended claims.

Moreover, the scope of the present application is not intended to be limited to the particular example arrangements of the process, machine, manufacture, and composition of matter, means, methods and steps described in this specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding arrangements described herein may be utilized according to the arrangements and alternative arrangements. Accordingly, the appended claims are intended to include within their scope such processes, machines, manufacture, compositions of matter, means, methods, or steps.

What is claimed is:

1. A method of operating a zero voltage transition circuit, comprising:
    providing a zero voltage transition circuit, comprising an input node receiving an input voltage, an output node outputting an output voltage, a switch node, an output inductor coupled in series between the switch node and the output node, an output capacitor coupled between the output node and a ground potential, a first switch for coupling the input node to the switch node, a second switch for coupling the switch node to the ground potential, a first auxiliary switch for coupling the input node to an auxiliary node, a second auxiliary switch for coupling the auxiliary node to the ground potential, and an auxiliary inductor coupled between the auxiliary node and the switch node;
    operating the zero voltage transition circuit so that the first switch is open, the second switch is closed, the first auxiliary switch is open, and the second auxiliary switch is open;
    closing the first auxiliary switch to couple the input voltage to the auxiliary node and to the auxiliary inductor;
    subsequently, monitoring the current flowing through the second switch and when a current is below a current cutoff threshold, opening the second switch;
    after a first delay period, opening the first auxiliary switch and subsequently closing the second auxiliary switch; and
    after a second delay period, closing the first switch.

2. The method of claim 1, wherein a resonant period time tr is determined by values of the auxiliary inductor, and parasitic capacitances in the first switch and the second switch.

3. The method of claim 2, wherein the first delay period is approximately one-sixth tr.

4. The method of claim 2, wherein the second delay period is approximately one-twelfth tr.

5. The method of claim 1, wherein the first auxiliary switch is opened when the voltage at the switch node is equal to or greater than one half the voltage at the input node.

6. The method of claim 1, wherein when the first switch is closed, a voltage across the first switch is approximately zero.

7. The method of claim 1, wherein the cutoff current for the second switch corresponds to a current flowing in the second switch that will result in the voltage at the switch node being greater than or equal to a voltage of one-half the input voltage when the first auxiliary switch is opened.

8. The method of claim 7, and further comprising:
comparing the voltage at the switch node to the voltage at the input node when the first switch is closed; and
responsive to the comparing, adjusting the cutoff current threshold for the second switch.

9. The method of claim 8, and further comprising iteratively performing the steps of:
operating the zero voltage transition circuit so that the first switch is open, the second switch is closed, the first auxiliary switch is open, and the second auxiliary switch is open;
closing the first auxiliary switch to couple the input voltage to the auxiliary node and to the auxiliary inductor;
subsequently monitoring the current flowing through the second switch and when the current is below a threshold, opening the second switch;
after a first delay period, opening the first auxiliary switch and subsequently closing the second auxiliary switch; and
after a second delay period, closing the first switch.

10. The method of claim 1, wherein providing the zero voltage transition circuit further comprises providing transistors that implement a buck converter.

11. The method of claim 1, wherein providing the zero voltage transition circuit further comprises providing MOS transistors implementing the first switch, the second switch, the first auxiliary switch, and the second auxiliary switch.

12. Circuitry for a zero voltage transition switching converter, comprising:
a first switch coupled between an input node for receiving an input voltage and a switch node;
a second switch coupled between the switch node and a ground node for coupling to a ground potential;
an output node for outputting a voltage to a load;
an output inductor coupled between the switch node and the output node;
an output capacitor coupled between the switch node and the ground node;
an auxiliary circuit for enabling a zero voltage transition in turning on the first switch, comprising a first auxiliary switch coupled between the input node and an auxiliary node, a second auxiliary switch coupled between the auxiliary node and the ground node, an auxiliary inductor coupled between the auxiliary node and the switch node; and
a controller coupled to each of the first switch, the second switch, the first auxiliary switch, and the second auxiliary switch, the controller configured to operate the zero voltage transition switching converter such that the first switch is open and the second switch is closed, subsequently, closing the first auxiliary switch, subsequently identifying when a current in the second switch falls below a cutoff current threshold; turning off the second switch, after a first delay period, opening the first auxiliary switch and then closing second auxiliary switch, and after a second delay period, closing the first switch.

13. The zero voltage transition converter of claim 12, wherein the controller is further configured to monitor the voltage at the switch node when the first switch is turned off, and to adjust the cutoff current threshold for the second switch responsive to the monitoring.

14. The zero voltage transition converter of claim 12 wherein a resonant time period tr is determined by values of auxiliary inductor, and parasitic capacitances in the first switch and the second switch.

15. The zero voltage transition converter of claim 13, wherein the first delay period is a time that is approximately one sixth of tr.

16. The zero voltage transition converter of claim 15, wherein the second delay period is a time that is approximately one twelfth of tr.

17. The zero voltage transition converter of claim 12, wherein when the first auxiliary switch is turned off, the voltage at the switch node is greater than or equal to one half of the voltage at the input node.

18. The zero voltage transition converter of claim 12, wherein the first switch, the second switch, the first auxiliary switch and the second auxiliary switch each comprise MOS transistors.

19. An integrated circuit zero voltage transition converter, comprising:
a semiconductor substrate;
a zero voltage transition converter on the semiconductor substrate further comprising a first switch coupled between an input node for receiving an input voltage and a switch node, a second switch coupled between the switch node and a ground node for coupling a ground potential, an output node for outputting a voltage to a load; an output inductor coupled between the switch node and the output node; and an output capacitor coupled between the switch node and the ground node;
an auxiliary circuit on the semiconductor substrate configured to enable a zero voltage transition in closing the first switch, comprising a first auxiliary switch coupled between the input node and an auxiliary node, a second auxiliary switch coupled between the auxiliary node and the ground node, and an auxiliary inductor coupled between the auxiliary node and the switch node; and
a controller on the semiconductor substrate coupled to each of the first switch, the second switch, the first auxiliary switch, and the second auxiliary switch, configured to operate the zero voltage transition switching converter such that the first switch is open and the second switch is closed, subsequently closing the first auxiliary switch, subsequently identifying when a current in the second switch falls below a cutoff current threshold; then opening the second switch, after a first delay period, opening the first auxiliary switch and then closing second auxiliary switch, and after a second delay period, closing the first switch.

20. The integrated circuit of claim 19, wherein each of the first switch, the second switch, the first auxiliary switch and the second auxiliary switch further comprises a MOS transistor.

* * * * *